(12) United States Patent
Tao

(10) Patent No.: US 11,118,994 B2
(45) Date of Patent: Sep. 14, 2021

(54) PRECISION DETECTION DEVICE FOR FORCE STANDARD MACHINE, FORCE VALUE COMPARISON MACHINE AND PRECISION DETECTION METHOD FOR FORCE STANDARD MACHINE

(71) Applicant: KUNSHAN INNOVATION TESTING INSTRUMENTS CO., LTD., Kunshan (CN)

(72) Inventor: Zecheng Tao, Kunshan (CN)

( * ) Notice: Subject to any disclaimer, the term of this patent is extended or adjusted under 35 U.S.C. 154(b) by 363 days.

(21) Appl. No.: 16/255,842

(22) Filed: Jan. 24, 2019

(65) Prior Publication Data
US 2019/0195719 A1   Jun. 27, 2019

Related U.S. Application Data

(63) Continuation of application No. PCT/CN2017/095075, filed on Jul. 29, 2017.

(30) Foreign Application Priority Data

Jul. 29, 2016   (CN) .......................... 20161060813.5

(51) Int. Cl.
*G01L 25/00* (2006.01)
*G01L 1/02* (2006.01)

(52) U.S. Cl.
CPC ................ *G01L 25/00* (2013.01); *G01L 1/02* (2013.01)

(58) Field of Classification Search
CPC .... G01N 3/10; G01N 3/12; G01N 2203/0048; G01G 23/015; G01G 23/01; G01L 25/006; G01L 25/00
See application file for complete search history.

(56) References Cited

U.S. PATENT DOCUMENTS

| 2,992,302 A | * | 7/1961 | Albert | G05D 16/18 200/81.5 |
| 3,296,855 A | * | 1/1967 | Newhall | G01G 5/00 73/862.584 |
| 3,407,644 A | * | 10/1968 | Yasunami | G01G 5/00 73/1.65 |

(Continued)

FOREIGN PATENT DOCUMENTS

| CN | 2755578 Y | * | 2/2006 |
| CN | 2755578 Y | | 2/2006 |

(Continued)

OTHER PUBLICATIONS

Internation Search Report of PCT/CN2017/095075, dated Sep. 27, 2017.

*Primary Examiner* — Tran M. Tran

(57) ABSTRACT

A precision detection device for a force standard machine includes a first hydraulic cylinder, a pipeline and a force loading device. A liquid medium is disposed in, the first hydraulic cylinder, and a liquid level area of the liquid medium is a known Value. The pipeline is a hollow tubular structure, and a first end of the pipeline is communicated with the liquid medium in the first hydraulic cylinder. The force loading device acts on the liquid medium, in the first hydraulic cylinder to produce a pressure increment or a pressure intensity increment on the, liquid medium. A force value comparison machine and a precision detection method for a force standard machine are also provided.

10 Claims, 1 Drawing Sheet

(56) References Cited

U.S. PATENT DOCUMENTS

| | | | | |
|---|---|---|---|---|
| 3,590,626 A * | 7/1971 | Hugli | G01L 27/005 | 73/1.67 |
| 3,777,546 A * | 12/1973 | Rollins | G01L 27/005 | 73/1.57 |
| 4,090,393 A * | 5/1978 | Kharitonov | G01L 25/00 | 73/1.08 |
| 4,144,904 A * | 3/1979 | Dits | F15B 11/042 | 137/625.3 |
| 4,309,896 A * | 1/1982 | Laurent | G01G 5/003 | 73/862.581 |
| 4,333,331 A * | 6/1982 | Mann | E02D 1/022 | 73/1.68 |
| 4,499,751 A * | 2/1985 | Riggs | G01L 27/005 | 73/1.67 |
| 4,658,921 A * | 4/1987 | Karpa | G01G 23/01 | 177/146 |
| 4,722,407 A * | 2/1988 | Gindy | G01G 5/003 | 177/146 |
| 4,739,663 A * | 4/1988 | Peterson | G01L 9/0091 | 73/703 |
| 4,798,094 A * | 1/1989 | Newhall | G01L 25/00 | 73/1.08 |
| 4,848,478 A * | 7/1989 | Hafner | G01G 23/01 | 177/50 |
| 5,025,654 A * | 6/1991 | Haefner | G01L 27/005 | 73/1.65 |
| 5,056,352 A * | 10/1991 | Muhrer | G01L 27/005 | 73/40 |
| 5,065,611 A * | 11/1991 | Angelosanto | G01L 27/005 | 73/1.61 |
| 5,249,502 A * | 10/1993 | Radocaj | F15B 15/1409 | 91/173 |
| 5,259,235 A * | 11/1993 | Kolb | G01L 27/005 | 73/1.65 |
| 6,321,585 B2 * | 11/2001 | Sgourakes | G01L 27/005 | 73/1.68 |
| 6,732,900 B2 * | 5/2004 | Hansen | B23K 20/123 | 228/112.1 |
| 6,792,371 B1 * | 9/2004 | Turner | G01G 23/01 | 177/50 |
| 6,848,292 B2 * | 2/2005 | Joseph | G01L 27/005 | 73/1.57 |
| 7,024,918 B2 * | 4/2006 | Bell | G01N 3/12 | 73/37 |
| 7,267,137 B1 * | 9/2007 | Shildkret | G01L 27/005 | 137/82 |
| 7,581,435 B2 * | 9/2009 | Pelletier | G01N 11/04 | 73/54.02 |
| 9,097,574 B2 * | 8/2015 | Yao | G01G 23/01 | |
| 9,116,033 B2 * | 8/2015 | Lin | G01G 23/012 | |
| 9,309,898 B2 * | 4/2016 | Gnessin | F04B 37/12 | |
| 9,389,135 B2 * | 7/2016 | Zhao | G01G 21/26 | |
| 9,476,790 B2 * | 10/2016 | Kajikawa | G01L 27/005 | |
| 9,696,229 B2 * | 7/2017 | Schulz | G01L 5/0028 | |
| 9,897,506 B2 * | 2/2018 | Hurst | G01L 27/005 | |
| 10,126,198 B2 * | 11/2018 | Adolfse | G01L 27/005 | |
| 10,385,835 B2 * | 8/2019 | Gnessin | F04B 37/14 | |
| 10,775,257 B2 * | 9/2020 | Platte | G01L 27/005 | |
| 2002/0158359 A1 | 10/2002 | Matsubayashi et al. | | |
| 2011/0146417 A1 * | 6/2011 | Sheeks | G01G 5/04 | 73/862.584 |
| 2012/0047884 A1 * | 3/2012 | McBride | F03G 6/00 | 60/327 |
| 2013/0327029 A1 * | 12/2013 | McBride | F15B 1/024 | 60/413 |
| 2015/0292974 A1 * | 10/2015 | Yamada | G01L 25/00 | 73/1.08 |
| 2018/0017460 A1 * | 1/2018 | Batista | G01F 25/0092 | |
| 2018/0300527 A1 | 10/2018 | Wang et al. | | |

FOREIGN PATENT DOCUMENTS

| | | | |
|---|---|---|---|
| CN | 101458142 A | | 6/2009 |
| CN | 202485785 U | * | 10/2012 |
| CN | 203037342 U | * | 7/2013 |
| CN | 103852212 A | | 6/2014 |
| CN | 205066922 U | * | 3/2016 |
| CN | 103884470 B | * | 6/2016 |
| CN | 205483243 U | * | 8/2016 |
| CN | 106017793 A | | 10/2016 |
| CN | 206019918 U | | 3/2017 |
| CN | 105136387 B | * | 4/2018 |
| JP | 08304210 A | | 11/1996 |

* cited by examiner

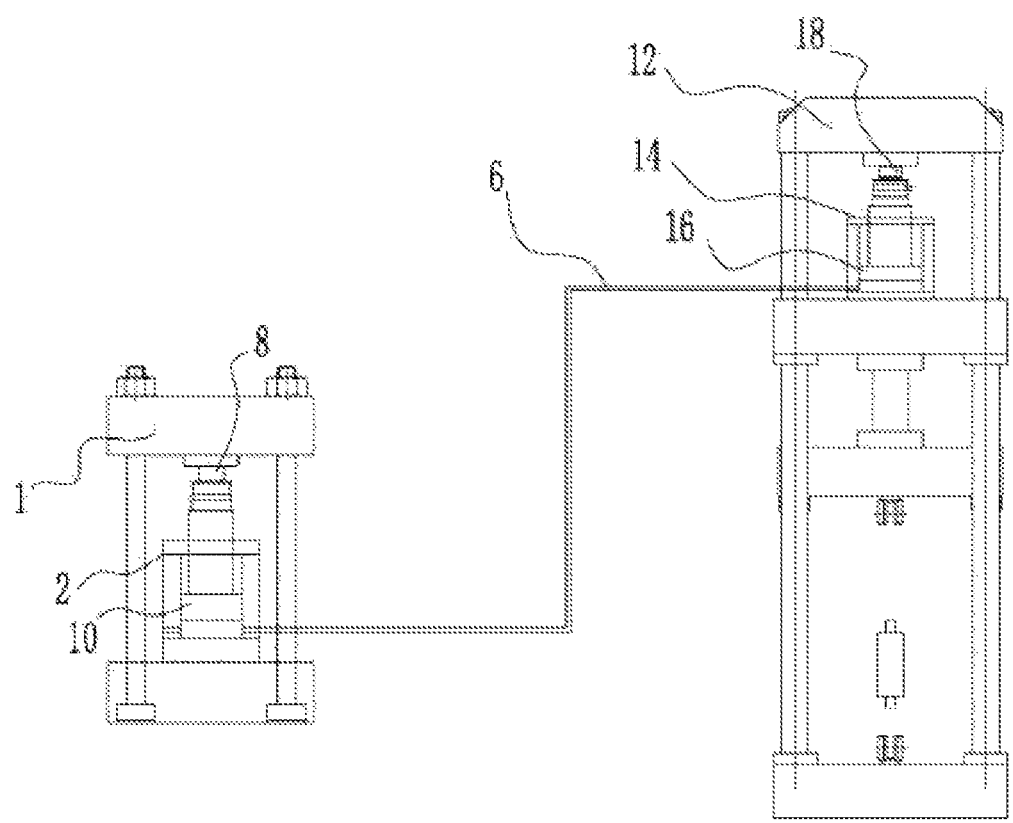

PRECISION DETECTION DEVICE FOR FORCE STANDARD MACHINE, FORCE VALUE COMPARISON MACHINE AND PRECISION DETECTION METHOD FOR FORCE STANDARD MACHINE

CROSS-REFERENCE TO RELATED APPLICATIONS

This application is a continuation of International Patent Application No. PCT/CN2017/095075 with a filing date of Jul. 29, 2017, designating the United States, now pending, and further claims priority to Chinese Patent Application No. 201610608135.5 with a filing date of Jul. 29, 2016. The content of the aforementioned applications, including any intervening amendments thereto, are incorporated, herein by reference.

TECHNICAL FIELD

The disclosure belongs to the technical field of mechanical measurement, and for example, relates to a precision detection device for a force standard machine, a force value comparison machine and a precision detection method for a force standard machine.

BACKGROUND OF THE PRESENT INVENTION

The precise measurement of large force values (hundreds of tons to thousands of tons, or tens of thousands tons to hundreds of thousands of tons) has always been a difficulty to be urgently solved in China and abroad, and has not been solved yet. Theoretically, if a detected sensor is verified with tens of thousands, of tons of weights, the device is very large and expensive, so it cannot be realized.

SUMMARY OF PRESENT INVENTION

A device having simple structure and capable of detecting the precision of a force standard machine of large force values, and, a method are provided.

A precision detection device for a force standard machine includes a first hydraulic cylinder, a pipeline and a force loading device; a liquid medium is disposed in the first hydraulic cylinder, and a liquid level area of the liquid medium is a known value; the pipeline is a hollow tubular structure, and a first end of the pipeline is communicated with the liquid medium in the first hydraulic cylinder; and the force loading device acts on the liquid medium in the first hydraulic cylinder to produce a pressure increment or a pressure intensity increment on the liquid medium.

Optionally, the device further includes a first measurement device, wherein the first measurement device is configured to measure a pressure value or pressure intensity value on a liquid level of the first hydraulic cylinder; and a measurement precision value of the first measurement device is a known value.

Optionally, the device further includes a first piston, wherein an end surface of the first piston contacts with the liquid level of the liquid medium in the first hydraulic cylinder; the first piston slides in the first hydraulic cylinder; a closed space is formed by, a side surface of the first piston and an inner wall of the first hydraulic cylinder; and the first, measurement device is configured to measure the pressure value or the pressure intensity value on the end surface of the first piston.

Optionally, the force loading device acts on the first piston: the force loading device enables the first piston to produce a pressure increment or a pressure intensity increment in a direction of compressing the liquid medium in the first hydraulic cylinder or in a direction opposite to the direction of compressing; and the first measurement device is configured to measure a value of a loading force produced on the first piston by the force loading device.

A force value comparison machine includes the above precision detection device for a force standard machine and a to-be-detected force standard machine; the to-be-detected force standard machine includes: a second hydraulic cylinder, wherein a liquid medium is disposed in the second hydraulic cylinder, and a second end of the pipeline is communicated with the liquid medium in the second hydraulic cylinder; a second piston, wherein an end surface of the second piston contacts with a liquid level in the second hydraulic cylinder, the second piston slides in the second hydraulic cylinder, a closed space is formed by a side surface of the second piston and an inner wall of the second hydraulic cylinder, and the area of the end surface of the second piston is known or measurable; and a second measurement device configured to measure a value of an acting force loaded on the second piston, wherein a measurement precision value of the second measurement device is an unknown value.

Optionally, the force value comparison machine further includes a third measurement device, wherein the third measurement device is configured to measure a value of an acting force loaded on the second piston and a measurement precision value of the third measurement device is a known value.

A precision detection method for a force standard machine includes:

communicating a measurement device with known measurement precision to a force standard machine through a pipeline, wherein the measurement device includes a first hydraulic cylinder having a liquid medium and a liquid level, area of a known value, and a force loading device configured to apply an acting force to the medium in the first hydraulic cylinder; the force standard machine includes a second hydraulic cylinder having a liquid medium, a second piston having an end surface which contacts with the liquid level in the second hydraulic cylinder and sliding in the second hydraulic cylinder, and a second measurement device configured to measure a value of an acting force loaded on the second, piston and having an unknown measurement precision value; a closed space is formed by a side surface of the second piston and an inner wall of the second hydraulic cylinder, and the area of the end surface of the second piston is known or measurable; the pipeline is a hollow tubular structure, and both ends of the pipeline are respectively communicated with the liquid medium in the first hydraulic cylinder and the liquid medium in the second hydraulic cylinder;

loading a first acting force into the first hydraulic cylinder by, the force loading device, and obtaining a second acting force in the second measurement device by using Pascal isobaric principle;

adding a third acting force continuously into the first hydraulic cylinder by the force loading device, wherein the third acting force ensures that the value in the second measurement device does not fluctuate; a ratio of the third acting force to the first acting force is a % which is a known value, and a is a nonnegative number;

increasing an acting force value continuously into the first hydraulic cylinder by the force loading device until the value in the second measurement device fluctuates, and recording a fluctuation acting force applied by the force loading device when the value in the second measurement device fluctuates; and computing the measurement precision of the second measurement device, with the measurement precision being equal to $$\frac{F0}{F1}\%,$$

wherein $$\frac{F1}{F2} = \frac{S1}{S2},$$

S1 is the liquid level area of the liquid medium in the first hydraulic cylinder, S2 is the area of the end surface of the second piston, F1 is the value of the first acting force, F2 is the value of the second acting force, F3 is the value of the third acting force, Fn is the fluctuation acting force, and % is a percent.

Optionally, after the measurement device of the known measurement precision is communicated with the force standard machine through the pipeline, before the first acting force is loaded into the first hydraulic cylinder by the force loading device and the second acting force is obtained in the second measurement device by using Pascal isobaric principle, the method further includes.

connecting a third measurement device to the second piston, wherein the third measurement device is configured to measure a value of an acting force loaded on the second piston and the measurement precision of the third measurement device is known; and loading a first measurement acting force into the first hydraulic cylinder by the force loading device, and obtaining a second measurement acting force value in the third measurement device, wherein the area S2 of the end surface of the second piston is equal to $$\frac{F20 * S1}{F10},$$

F10 is the value of the first measurement acting force, F20 is the value of the second measurement acting force, and · is a multiplying operator.

Optionally, the measurement device further includes a first piston and a first measurement device; the end surface of the first piston contacts with the liquid level in the first hydraulic cylinder, the first piston slides on the inner wall of the first hydraulic cylinder, and a closed space is formed by the side surface of the first piston and the inner wall of the first hydraulic cylinder; the force loading device acts on the first piston, and the force loading device enables the first piston to produce a pressure increment or a pressure intensity increment in a direction of compressing the liquid medium in the first hydraulic cylinder or in a direction opposite to the direction of compressing; and the first measurement device is configured to measure a value of a loading force produced on the first piston by the force loading device.

In the above technical solution, the precision detection device is disposed. When the precision detection device is used, a first oil cylinder on the precision detection device is communicated with a second oil cylinder on the to-be-measured force standard machine through the pipeline. According to the Pascal principle, an acting force of a known value is loaded on the liquid medium of the first oil cylinder; the acting force area in the first oil cylinder and the acting force area in the second oil cylinder are known; and then the value of the acting force in the second piston can be calculated, i.e., a read value of the acting force on the force standard machine. The acting force is continuously loaded on the first oil cylinder until the reading on the force standard machine produces a minimum fluctuation, and a ratio of the acting force that produces a value fluctuation on the force standard machine to the acting force of the known value loaded at first is the measurement precision value of the force standard machine.

DESCRIPTION OF THE DRAWINGS

FIG. 1 is a structural schematic diagram of a force value comparison machine in an embodiment.

In the figure, 1—precision detection device: 2—first hydraulic cylinder; 6—pipeline; 8—first measurement device; 10—first piston; 12—force standard machine; 14—second hydraulic cylinder; 16—second piston; and 18—second, measurement device.

DETAILED DESCRIPTION OF PREFERRED EMBODIMENTS

The technical solutions in the following embodiments are described below in combination with the drawing and through the detailed description.

As shown in FIG. 1, a precision detection device 1 in the present embodiment includes a first hydraulic cylinder 2, a pipeline 6 and a force loading device.

A liquid medium is disposed in the first hydraulic cylinder 2, and a liquid level area of the liquid medium is a known value.

The pipeline 6 is a hollow tubular structure, and a first end of the pipeline 6 is communicated with the liquid medium in the first hydraulic cylinder 2.

The force loading device may act on the liquid medium in the first hydraulic cylinder 2 to produce a pressure increment or a pressure intensity increment on the liquid medium in the first hydraulic cylinder 2.

Optionally, the, precision detection device 1 further includes a first measurement device 8, wherein the first measurement device 8 may be configured to measure a pressure value or pressure intensity value on a liquid level of the first hydraulic cylinder 2; and a measurement precision value of the first measurement device 8 is a known value.

Optionally, the precision detection device 1 further includes a first piston 10. An end surface of the first piston 10 contacts with the liquid level of the liquid medium in the first hydraulic cylinder 2. The side surface of the first piston 10 may be provided with a seal ring. The first piston 10 slides in, the inner wall of the first hydraulic cylinder 2, and forms a sealed space with the first hydraulic cylinder 2. Seal sliding of the first piston in the first hydraulic cylinder 2 is realized between the side surface of the first piston 10 and the first hydraulic cylinder 2 through hydrostatic seal. The first measurement device S can be configured to measure the pressure value or the pressure intensity value on the end surface of the first piston 10.

Optionally, the force loading device acts on the first piston 10 and can enable the first piston 10 to produce a force increment in a direction of compressing the liquid medium in the first hydraulic cylinder 2 or in, a direction opposite to the direction of compressing. The first measurement device 8 can be configured to measure a value of a loading force produced on the first piston 10 by the force loading device 5

The present embodiment provides a force value comparison machine which includes the precision detection device 1 for a force standard machine and a to-be-detected force standard machine 12. The to-be-detected force standard machine 12 includes: a second hydraulic cylinder 14, a second piston 16 and a second, measurement device 18.

A liquid medium is disposed in the second hydraulic cylinder 14, and a second end of the pipeline 6 is communicated with the liquid medium in the second hydraulic cylinder 14.

An end surface of the second piston 16 contacts with a liquid level in the second hydraulic cylinder 14. The side surface of the second piston 16 may be provided with a seal ring. The second piston 16 slides in the inner wall of the second hydraulic cylinder 14, and forms a sealed space with the second hydraulic cylinder 14. Seal sliding of the second piston 16 in the second hydraulic cylinder 14 is realized between the side surface of the second piston 16 and the second hydraulic cylinder 14 through hydrostatic seal. The area of the end surface of the second piston 16 is known or measurable.

The second measurement device 18 can be configured to measure a value of an acting force loaded on the second piston 16. A measurement precision value of the second measurement device 18 is an unknown value.

Optionally, the force value comparison machine further includes a third measurement device. The third measurement device may be configured to measure a value of an acting force loaded on the second piston 16, and the measurement precision value of the third measurement device is a known value. The third measurement device can also be configured to measure the area of the end surface of the second piston 16.

The present embodiment provides a precision detection method for a force standard machine 12. The method includes the following steps:

communicating a measurement device with known measurement precision to a force standard machine 12 through a pipeline 6, wherein the measurement device includes a first hydraulic cylinder 2 having a liquid medium and, a liquid level area S1 of the liquid medium of a known value, and a force loading device configured to apply an acting force to the liquid medium in the first hydraulic cylinder 2; the force standard machine 12 includes a second hydraulic cylinder 14 having a liquid medium, a second piston 16 having an end surface which contacts with the liquid level of the liquid medium in the second hydraulic cylinder 14 and having a side surface which slides relative to the inner wall of the second hydraulic cylinder 14, and a second measurement device 18 configured to measure a value of an acting force loaded on the second piston 16 and having an unknown measurement precision value; a sealed space is formed between the second piston 16 and the innerwall of the second hydraulic cylinder 14, and the area S2 of the end surface of the second piston 16 is known or measurable; the pipeline 6 is a hollow tubular structure, and both ends of the pipeline 6 are respectively communicated with the liquid medium in the first hydraulic cylinder 2 and the liquid medium in the second hydraulic cylinder 14;

loading a first acting force F1 into the first hydraulic cylinder 2 by the force loading device, and obtaining a second acting force F2 in the second measurement device 18 by using Pascal isobaric principle $$\left(\frac{F1}{F2} = \frac{S1}{S2}\right);$$

adding a third acting force F3 continuously into the first hydraulic cylinder 2 by the, force loading device, wherein the third acting force F3 ensures that the value in the second measurement device 18 does not fluctuate; a ratio $$\frac{F3}{F1}$$

of the third acting force F3 to the first acting force F1 is a % which is a known value, and a is a nonnegative number;

increasing an acting force value continuously into the first hydraulic cylinder 2 by the force loading device until the value in the second measurement device 18 fluctuates, and recording a fluctuation acting force value Fn, applied by the force loading device when the value in the second measurement device 18 fluctuates; and computing the measurement precision of the second measurement device 18, with the measurement precision being equal to $$\frac{F0}{F1}\%,$$

i.e., $$\frac{F0 * \frac{S2}{S1}\%}{F2}$$

wherein % is a percent and · is a multiplying operator.

Optionally, after the measurement device of the known measurement precision is communicated with the force standard machine through the pipeline, before the first acting force is loaded into the first hydraulic cylinder by the force loading device and the second acting force is obtained in the second measurement device by using Pascal isobaric principle, the precision detection method for the force standard machine further includes:

connecting a third measurement device to the second piston 16, wherein the third measurement device is configured to measure a value of an acting force loaded on the second piston 16 and the measurement precision of the third measurement device is known; and loading a first measurement acting force F10 into the first hydraulic cylinder 2 by the force loading device, and obtaining a second measurement acting force value F20 in the third measurement device, wherein the area S2 of the end surface of the second piston 16 is equal to $$\frac{F20 * S1}{F10}.$$

The third measurement device may be the second measurement device in FIG. 1. The difference between the third measurement device and the second measurement device is that, the measurement precision value of the third measurement device is a known value and the measurement precision value of the second measurement device is an unknown value.

Optionally, the measurement device further includes a first piston 10 and a first measurement device 8.

The end surface of the first piston 10 contacts with the liquid level in the first hydraulic cylinder 2; and the first piston 10 can slide in the inner wall of the first hydraulic cylinder 2.

The side surface of the, first piston 10 may be provided with a seal ring. The first piston 10 slides in the inner wall of the first hydraulic cylinder 2, and forms a sealed space with the first hydraulic cylinder 2. Seal sliding of the first piston in the first hydraulic cylinder 2 is realized between the side surface of the first piston 10 and the first hydraulic cylinder 2 through hydrostatic seal.

The force loading device acts on the first piston 10 and can enable the first piston 10 to produce a pressure increment or a pressure intensity increment in a direction of compressing the liquid medium in the first hydraulic cylinder 2 or in a direction opposite to the direction of compressing.

The first measurement device 8 can be configured to measure a value of a loading force produced on the first piston 10 by the force loading device.

Embodiment 1

It is known that the area ratio of the first piston 10 to the second piston 16 is 1:1000, and the measurement precision of the first measurement device 8 is 0.1%, wherein ":" is a ratio symbol.

Gravity F1 corresponding to weight of it is loaded on the first piston 10, and the value obtained on the second measurement device 18 is F2=1000 t×g, wherein gravity G=m×g, m is the weight, g is a proportionality coefficient, and g may be 9.8 N/kg.

Based on this, gravity corresponding to weight of 1 kg is loaded on the first piston 10, and then, the value obtained on the second measurement device 18 does not fluctuate.

Based on this, gravity is continuously loaded on the first piston 10 and gravity corresponding to weight of 1 kg is increased each time until the value obtained on the second measurement device 18 fluctuates when gravity corresponding to weight of 5 kg is increased.

Fn=5 kg×g, and the area ratio is $$\frac{S2}{S1} = 1000.$$

The obtained calculated results reflect that the pressure value in the second hydraulic cylinder 14 is the gravity corresponding to the weight of 5 t. Then, the measurement precision value of the force standard machine 12 is $$\frac{F0}{F1} = \frac{F0 * \frac{S2}{S1}}{F2} = 5t/1000t,$$

i.e., the measurement precision value of the force standard machine 12 is 0.5%, wherein / is a division operator.

Embodiment 2

It is known that the measurement precision of the first, measurement device 8 is 0.1%, and the area ratio of the first piston 10 to the second piston 16 is unknown. At this moment, a third measurement device of known precision is added on the second piston 16.

Gravity F1 corresponding to weight of 200 kg is loaded on the first piston 10. The reading obtained in the third measurement device is gravity F2 corresponding to weight of 200 t. The area ratio of the first piston 10 to the second piston 16 is equal to 200 kg/200 t, i.e., 1:1000.

Gravity corresponding to weight of 1 t is loaded on the first piston 10, and the data obtained on the second measurement device 18 is gravity corresponding to weight of 1000 t.

Based on this, gravity corresponding to weight of 1 kg is loaded on the first piston 10, and then, the value obtained on the second measurement device 18 does not fluctuate.

Based on the above contents in the present embodiment, gravity is continuously loaded on the first piston 10 and the acting force added each time may be gravity corresponding to weight of 1 kg until the value obtained on the second measurement device 18 fluctuates when gravity corresponding to weight of 5 kg is increased.

Fn=5 kg×g, and the area ratio is $$\frac{S2}{S1} = 1000:1.$$

The calculated results reflect that the pressure value in the second hydraulic cylinder 14 is the gravity corresponding to the weight of 5 t. The measurement precision value of the force standard machine 12 is $$\frac{F0}{F1} = \frac{F0 * \frac{S2}{S1}}{F2} = 5t/1000t,$$

i.e., the measurement precision value of the force standard machine 12 is 0.5%. The method in the above embodiment not only detects the measurement precision of the to-be-detected force value comparison machine, but also measures the friction force between the piston and the hydraulic cylinder, and measures the area of the piston of the to-be-detected force value comparison machine.

INDUSTRIAL APPLICABILITY

The precision detection device for the force standard machine, the force value comparison machine and the precision detection method for the force standard machine can be used to detect the measurement precision of the to-be-detected force value comparison machine.

I claim:
1. A force value comparison machine, comprising a precision detection device (1), a to-be-detected force standard machine (12), and a pipeline (6), wherein
 the precision detection device (1) comprises:
  a first hydraulic cylinder (2) and a first piston (10), wherein a first liquid medium is disposed in the first hydraulic cylinder (2), and an end surface of the first piston (10) contacts with the first liquid medium in the first hydraulic cylinder (2);
 the to-be-detected force standard machine (12) comprises:
  a second hydraulic cylinder (14), a second piston (16), and a second measurement device (18), wherein a second liquid medium is disposed in the second hydraulic cylinder (14), wherein a first end of the pipeline (6) is communicated with the first liquid medium in the first hydraulic cylinder (2), and a second end of the pipeline (6) is communicated with the second liquid medium in the second hydraulic cylinder (14);

wherein an end surface of the second piston (16) contacts with the second liquid medium in the second hydraulic cylinder (14); and when the first piston (10) is configured to receive a first acting force F1 which enables the second piston (16) to correspondingly receive a second acting force F2, the second measurement device (18) is configured to measure a value of the second acting force F2 loaded on the second piston (16);

the first piston (10) is configured to continue receiving a third acting force Fn until the value of the second acting force F2 starts to fluctuate;

a precision of the second measurement device (18) is configured to be calculated based on area ratio of the first and second piston (10), (16), the value of the second acting force F2, and the value of the third acting force Fn.

2. The force value comparison machine according to claim 1, wherein the area of the end surface of the first piston (10) is S1, the area of the end surface of the second piston (16) is S2, the precision of the second measurement device (18) equals to $$\frac{Fn * \frac{S2}{S1}}{F2}\%.$$

3. The force value comparison machine according to claim 1, wherein the force value comparison machine comprises a first measurement device (8), the first measurement device (8) is configured to measure a value of the first acting force F1 loaded on the first piston (10).

4. The force value comparison machine according to claim 3, when a precision of the first measurement device is predefined and the area ratio of the first and second piston (10), (16) are undefined, the area ratio of the first and second piston (10), (16) equals to the precision of the first measurement device.

5. The force value comparison machine according to claim 1, wherein the first piston (10) slides in the first hydraulic cylinder (2), and a closed space is formed between a side surface of the first piston (10) and an inner wall of the first hydraulic cylinder (2).

6. The force value comparison machine according to claim 1, where the first acting force F1 is loaded on the first piston (10) to produce a pressure increment or a pressure intensity increment in a direction of compressing the first liquid medium in the first hydraulic cylinder (2) or in a direction opposite to the direction of compressing.

7. The force value comparison machine according to claim 1, wherein the pipeline (6) is a hollow tubular structure.

8. A method for measuring a precision of a to-be-detected force standard machine (12), comprising:

applying a first acting force Fl on a first piston (10) of a precision detection device (1);

measuring a second acting force F2 loaded on a second piston (16) of the to-be-detected force standard machine (12) accordingly;

continuing adding a third acting force Fn until the value of the second acting force F2 starts to fluctuate; and calculating a precision of the second measuring device based on area ration of the first and second piston (10), (16), the value of the second acting force F2, and the value of the third acting force Fn.

9. The method of claim 8, wherein an area of an end surface of the first piston (10) is S1, an area of an end surface of the second piston (16) is S2, the precision of the second measurement device (18) equals to $$\frac{Fn * \frac{S2}{S1}}{F2}\%.$$

10. The method of claim 8, further comprising:

measuring a value of the first acting force Fl loaded on the first piston (10).

* * * * *